(No Model.)

W. N. BARROWS.
Culinary Pot.

No. 238,272. Patented March 1, 1881.

Witnesses:
P. C. Dieterich
Fred. G. Dieterich

Inventor:
Wm. N. Barrows.
per Lloyd Wigand
Attorney.

UNITED STATES PATENT OFFICE.

WILLIAM N. BARROWS, OF PHILADELPHIA, PENNSYLVANIA.

CULINARY POT.

SPECIFICATION forming part of Letters Patent No. 238,272, dated March 1, 1881.

Application filed October 19, 1880. (No model.)

*To all whom it may concern:*

Be it known that I, WILLIAM NELSON BARROWS, of the city and county of Philadelphia, and State of Pennsylvania, have invented certain new and useful Improvements in Pots or Boilers for Culinary Purposes; and I do hereby declare the following to be a sufficiently full, clear, and exact description thereof to enable others skilled in the art to make and use the said invention.

My invention relates to that class of culinary vessels made of cast-iron and known to the trade as "bellied pots."

The nature of this invention consists in forming a pouring-lip extending from the top of the pot to such a point below the belly or greatest diameter of the pot that fluid may be completely emptied therefrom without placing the pot with the bottom in vertical plane, and also a handle for tilting purposes formed on the pot, so that the center of gravity of the pot and its contents shall always be so disposed in relation to the bail and the tilting-handle that part of the weight will always press upon the tilting-handle in the act of pouring.

I will now proceed to describe particularly the mode in which this invention is made and operated, referring in so doing to the drawings annexed and letters of reference marked thereon.

Figure 1:
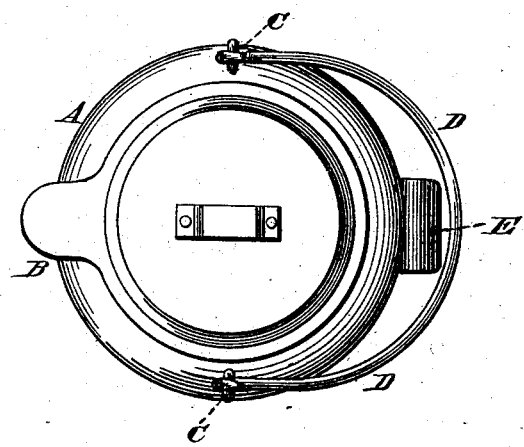
Figure 2:
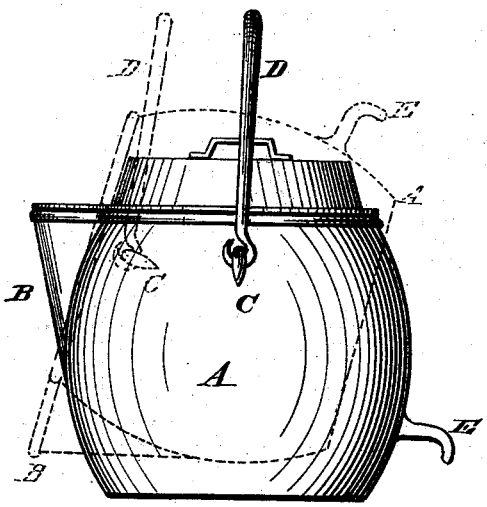

Figure 1 shows a plan of the invention, and Fig. 2 a side elevation. The dotted lines in Fig. 2 indicate the position that the pot assumes in pouring when entirely emptying or pouring out its contents.

The same letters of reference apply to the same parts in both figures.

A is a bellied or spheroidal-shaped pot; B, a spout open at the top and having the front side tangential to the spherical part of the pot; D, the bail secured to the ears C, and E a tilting-handle placed below the center of the belly of the pot. These pots are made by casting.

It will be seen on inspection of the drawings that all fluid in the pot can be entirely emptied before tilting the pot with the bottom in vertical position, and the weight will at no time rest entirely on the bail D in pouring, but will be partially supported on the tilting-handle E. The bail D may be made of such proportions as to rest, when not in use, on the handle E without contact with the body or belly of the pot.

I am aware that pouring-lips have been applied to bellied or sauce pans having rigid handles at right angles to such lips; also, that pouring-lips have been applied to preserving-kettles having bails and a tilting-handle on the rims at a point opposite to the lip. In none of these could the pot be entirely emptied when the spout and pot rest upon a horizontal surface, and in this respect they fail to accomplish the purpose of this invention, and they are hereby disclaimed.

Having described my invention, what I claim as new therein, and as originally of my invention, is—

A new article of manufacture consisting of a bellied pot provided with a bail, D, and pouring-lip B, extending from the plane of the rim of the body A, in the direction of a tangent, to the belly of the pot below its greatest diameter, and a handle, E, arranged in the manner substantially as and for the purpose described and shown.

WM. N. BARROWS.

Witnesses:
VAN W. BUDD,
J. DANIEL EBY.